Jan. 2, 1923.

H. V. R. READ ET AL.

APPARATUS FOR FILLING AND CLOSING CAPSULES OR CONTAINERS.

FILED JULY 15, 1920.

INVENTORS
H. V. R. Read
R. H. Campbell
BY H. R. Kerslake
ATTORNEY

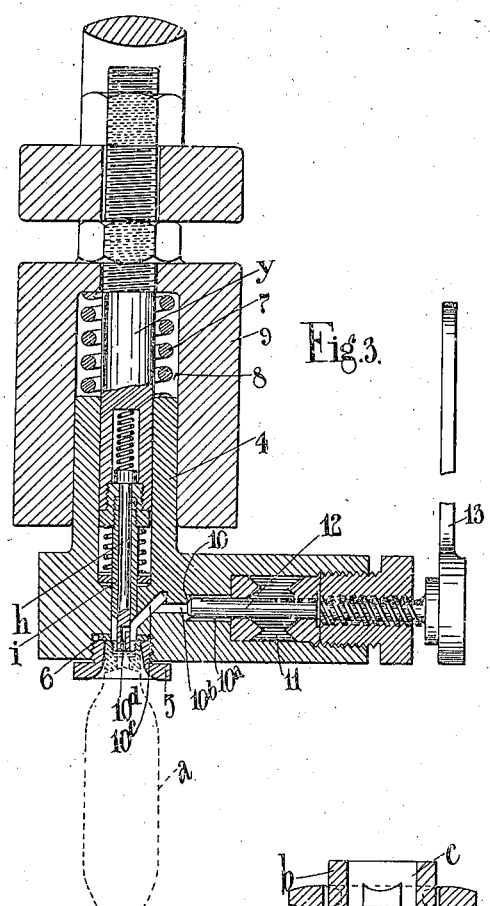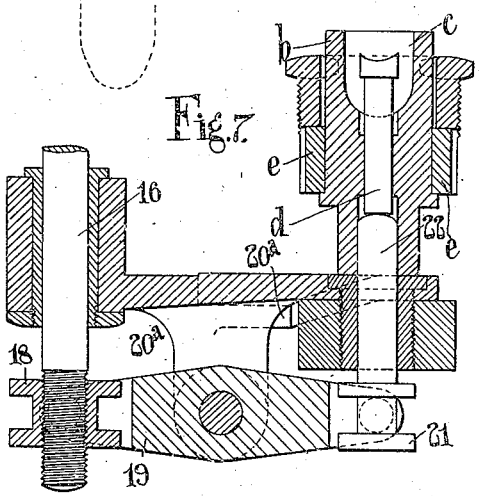

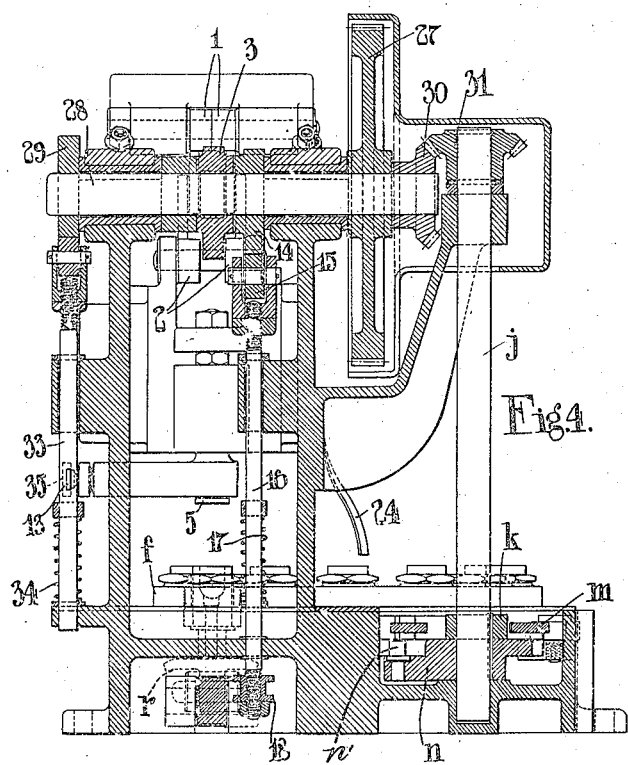

Patented Jan. 2, 1923.

1,440,745

UNITED STATES PATENT OFFICE.

HARRY VAUGHAN RUDSTON READ AND ROBERT HUNTER CAMPBELL, OF EDMONTON, ENGLAND.

APPARATUS FOR FILLING AND CLOSING CAPSULES OR CONTAINERS.

Application filed July 15, 1920. Serial No. 396,387.

*To all whom it may concern:*

Be it known that we, HARRY VAUGHAN RUDSTON READ and ROBERT HUNTER CAMPBELL, both subjects of the King of Great Britain and Ireland, and residing at Angel Road, Edmonton, in the county of Middlesex, England, have invented certain new and useful Improvements in Apparatus for Filling and Closing Capsules or Containers, of which the following is a specification.

This invention relates to apparatus for filling and closing capsules or containers, more particularly metallic containers having internally threaded necks provided with a seating upon which rests a small composition ring, a steel plate and a closing ring, as described in British Patent No. 135,596, and has for its object to provide improved apparatus for the filling and closing of such vessels.

According to British Patent No. 135596, capsules or containers are described which are adapted to contain gases or liquids under pressure, these capsules being provided with an internal thread in their necks adjacent their sealing surfaces, a plastic ring being caused to flow radially into the threaded portion in order to retain a sealing disc upon the sealing surface, a buckled metal disc or dished cup being interposed between the plastic ring and the sealing disc.

The invention consists in apparatus for use in connection with the filling and closing of capsules or containers in which a plunger is caused to operate against the action of an opposing balance means, such as a spring or the like, the latter being regulable in order to obtain a resultant pressure appropriate to that necessary for the flowing of the material employed to effect sealing.

The invention also consists in a cam actuated internal and external double-acting plunger pressing upon a metallic closing ring against a balanced determined pressure caused by a balance means, such as a spring or the like, the pressure being regulable according to the flowing point of the metal flowed to effect sealing.

The invention also consists in apparatus for filling and closing capsules or containers including cam actuated toggles and a return spring effecting reciprocation of a crosshead carrying a hollow sealing plunger and a coaxial resiliently supported filling plunger operating in conjuction with a resiliently supported die.

The invention also consists in details in connection with filling and closing capsule or container machines as hereinafter described and as pointed out in the claims annexed hereto.

Referring to the accompanying diagrammatic drawings:—

Figure 3 is an enlarged sectional view of the cross-head incorporating a known form of filling valve.

Figure 4 is a vertical sectional elevation taken through the axis of the cam shaft on line 4—4 of Fig. 2.

Figures 5 and 6 show respectively in section and in front elevation a modified means according to the present invention of effecting appropriate opening and closing of the filling valve.

Figure 7 is an enlarged detail view illustrating convenient ejector mechanism.

Figure 1:
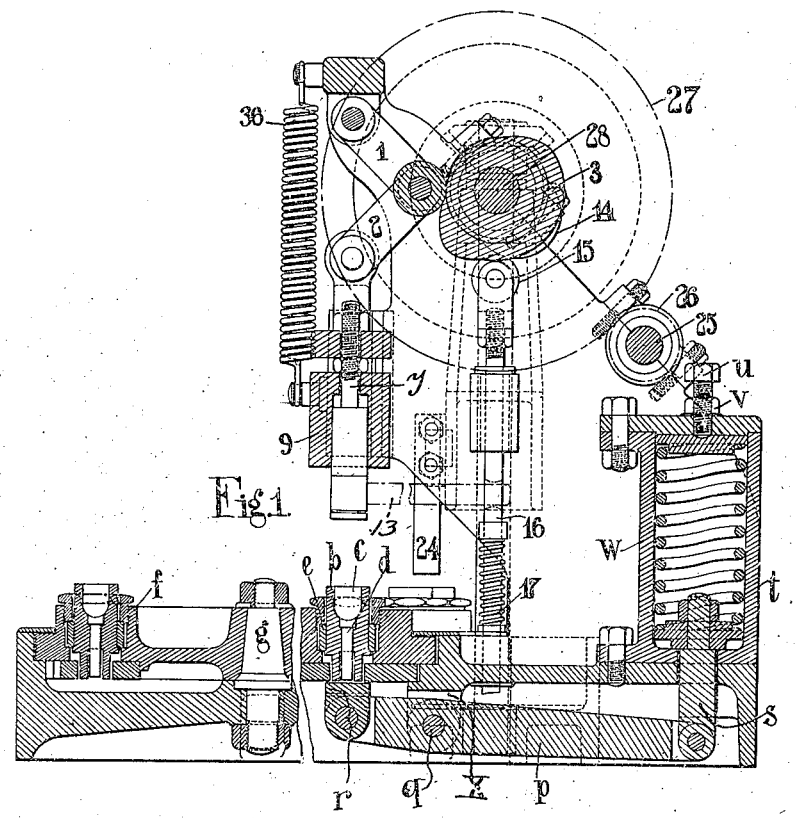
Figure 1 is a broken vertical section through a convenient form of filling and closing machine according to the present invention.

In carrying the invention into effect in one form illustrated by way of example in Figures 1 to 4 and 7, as applied to the filling of capsules adapted to contain compressed or liquefied gas, we place the lower end of capsule $a$ into a die $b$ formed with an aperture $c$ fitting the capsule and with a plunger or extractor pin $d$ formed at its upper end to fit the base of the capsule, (Figure 7).

The die $b$ carrying this extractor pin is mounted in a guide $e$ secured to a turntable $f$. The turntable $f$ is rotatable about a vertical spindle $g$ and carries a number of such capsule dies near its periphery, (see Figure 2) every one of which is brought successively beneath the plungers $h$ and $i$ (Figure 3).

Successive partial rotation of the turntable $f$ is effected by rotation of the shaft $j$ upon which is mounted an arm $n$ carrying a pin $n'$ engaging slots $o$ in the turntable $f$. The shaft $j$ also carries a cam $k$ which causes the catch lever $m$ to release the locating pin $m'$ from the peripheral slots in the table $f$, thus allowing the pin $n'$ carried upon the arm $n$ to move the table forward. A cam $l$ is also mounted upon the shaft $j$ and serves to locate the turntable in position during the stationary periods of the latter, the stop pin $m'$ serving as an additional lock for this purpose. Beneath the turntable is a pressure lever $p$ pivoted at $q$ and carrying at one end a pressure pad or platform $r$. The opposite end of $p$ is attached through a connecting pin $s$ to one end of a compression spring $t$ the downward pressure being adjustable by means of the set screw $u$ and lock nut $v$ carried at the upper end of a casing $w$ enclosing the spring. This lever $p$ is carried in a bracket $x$ forming part of the main frame.

Disposed vertically above the platform $r$ are the filling and closing plungers $h$ and $i$ respectively, these being carried upon a ram $y$ adapted to move longitudinally under the action of toggle levers 1 and 2 and cam 3.

The partially hollow filling plunger $h$ is resiliently supported within the hollow plunger $i$ the latter being screwed rigidly to the ram $y$. Surrounding these plungers is a convenient form of filling valve box chamber 4, carrying at its lower end a socket 5 and packing 6 adapted for the reception of the capsule necks. This chamber 4 bears at its upper end upon a compression spring 7 housed within the annular recess 8 in the crosshead 9. In order to secure the chamber 4 and cross head 9 together, said chamber may, as shown in Fig. 6, be provided with ears $4^a$ engaging screws $4^b$, which extend into the cross-head 9. These screws are surrounded by springs $4^c$.

At the side of the chamber 4 is incorporated the valve box comprising a seating 10, gland packing 11, threaded valve spindle 12 and operating arm 13.

Figure 2:
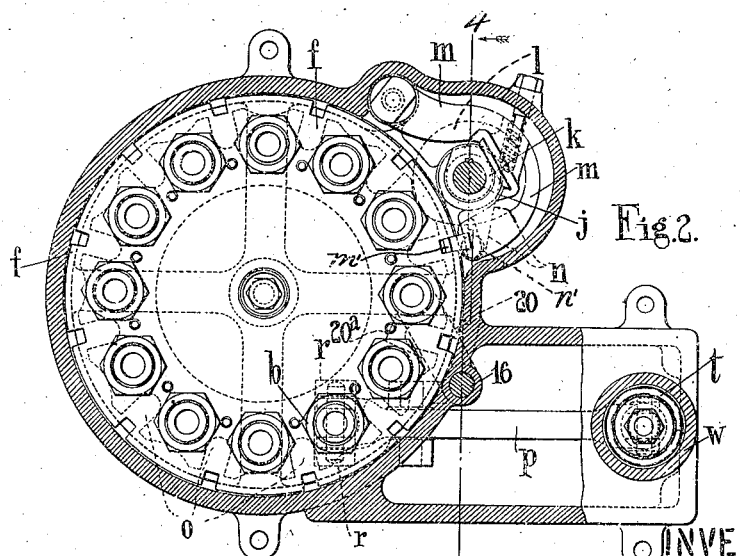
Figure 2 is a horizontal sectional view thereof.

Ejection of the capsules after having been filled and closed is effected by the ejector cam 14 mounted on the shaft 28. This cam during rotation engages the roller 15 arranged at the upper end of the ejector rod and depresses said rod against the action of a return spring 17. The lower end of the ejector rod 16 carries a recessed collar 18 engaging which is one forked end of a rocking arm 19 pivoted in a bracket 20 (Figures 2 and 7). The other forked end of this rocking arm engages a similar collar 21 carried upon a tappet 22 and is adapted to lift the ejector $d$ upon depression of the ejector rod 16.

As indicated by dotted lines in Figure 2, the bracket 20 is provided with a cam surface $20^a$ (see also Figure 7) for the purpose of lifting the die $b$ into the position indicated in Figure 7 from the position it would occupy subsequently to completion of the capsule closing operation.

A light spring 24 (Figure 1) is preferably provided to throw the ejected capsule clear of the filling table.

As regards driving of the several parts of the machine, power is applied to rotate the driving shaft 25 which carries a gear wheel 26 engaging a comparatively large gear wheel 27 mounted upon the cam shaft 28. This cam shaft in addition to carrying the closing cam 3, the ejector cam 14 and filling cam 29 has mounted thereon a bevel wheel 30 transmitting motion to a corresponding bevel wheel 31 carried on a vertical turntable feed shaft $j$.

The filling cam 29 effects depression at the appropriate time against the action of spring 34 of the filling rod 33 thereby causing the filling valve to be opened by the handle 13 thereof being operatively connected with the rod at 35 (see Figure 4).

In operation the capsules are fed into the dies $b$ by hand or by any other convenient means and the driving shaft 25 is rotated either by hand or by power.

The feed table being assumed to be momentarily at rest and locked by the combined action of the catch $m'$ and Geneva mechanism the cam shaft 28 is rotated in an anti-clockwise direction as viewed in Figure 1 and the cam 3 bears upon the toggle roller thus causing the crosshead 9 to move vertically downwards in its slides.

The first result of this downward movement is to cause the socket 5 to envelope and make a gas tight joint with the capsule neck.

Downward movement of the valve box 4 is now arrested by this contact of the capsule neck with the packing 6; the downward movement of the crosshead 9 and ram $y$ can, however, proceed on account of the compressibility of the spring 7.

The inner plunger $h$ rests upon the crown of the sealing disc in the capsule neck and upon opening of the filling valve permits the gas which is supplied to the annular space $10^a$ through a convenient duct (not shown) to pass through ducts $10^b$, $10^c$, and $10^d$ into the capsule. The opening of the filling valve is effected by the depression of the filling rod 33 by means of the cam 29.

During the filling the ram remains substantially stationary but upon completion of this operation the cam 29 allows the rod 33 to rise and thus lift the end of the arm 13, so closing the valve, and simultaneously a further portion of the cam 3 causes a further downward movement of the ram to take place.

This forces the hollow plunger $i$ upon the capsule closing piece within the capsule neck and forces the die $b$ downwards upon the platform $r$. A regulable pressure of sealing is thus provided by the spring controlled pressure lever $p$.

Further rotation of the shaft 28 allows the springs 36 to lift the cross head 9 and its co-operative parts to the extremity of its upward travel in which position it remains, whilst the toggle roller rests upon the "dwell" position of the cam 3, preparatory to meeting the operative portion thereof in the next revolution of the cam shaft 28.

During this "dwell" period, however, the locking cam and feeding arm co-operate to effect rotation of the feed table through an amount corresponding to the pitch of the slots o therein.

The above operations now recur, and two filled and sealed capsules now rest in two consecutive turntable dies, the foremost capsule occupying a position immediately above the ejector pin 22, the foremost die b having been guided up into the position shown in Figure 7 by the cam surface 20ª, as explained above. The ejector rod is now depressed by its cam and the rocker arm 19 moved into the position in which it is represented in Figure 7, this movement causing the extractor pin d to rise and eject the capsule with the assistance of the spring 24 into a suitable adjacent receptacle.

The ejection operation of every capsule in turn is thus performed substantially at the same time as the filling operation of the capsule which is next but one behind it on the feed table.

In order to dispense with the necessity of providing a filling cam to effect opening and closing of the filling valve at the appropriate times, we sometimes provide mechanism whose operation depends upon the relative motion taking place between the cross head and the filling head during the downward movement of these parts.

A convenient form of such mechanism is represented in Figures 5 and 6, in which similar reference letters to those used for corresponding parts in Figures 1 to 4 are employed.

Between two projecting lugs 37 and 38 upon the crosshead 9 is pivotally mounted a rocking arm 39 continuously urged in a clockwise direction (as viewed in Figure 5) by a compression spring 40 encircling a stud 41 screwed into the crosshead.

The lower end of this rocking arm is provided with a hardened tappet surface 42, and the arm 39ª carries an adjustable tripping screw 43.

Beneath the rocking arm and pivotally supported in lugs 44 formed upon the valve head is a bell crank lever 45, one arm of which is provided with a hardened surface 46 and the other arm is forked and carries pins 47 engaging a collar 48 secured to the valve stem 12.

In operation, during downward travel of the crosshead, first the plunger h contacts with the sealing disc, then the socket 5 meets the capsule neck and is arrested together with all the parts carried by the filling head 4. The crosshead however continues its downward movement, compressing the spring 7 as before until the heel 42 meets the block 46.

Further depression of the crosshead therefore causes the bell crank lever 45 to be rocked in an anti-clockwise direction (as viewed in Figure 5) and the valve spindle 12 to be moved to the right against the action of a compression spring 49, the collar 50 being integral with 12.

Gas thus passes from the space 10ª to the capsule similarly as described above.

Meanwhile, however, the screw 43 has been arrested by the arch 44ª, and the heel 42 has been moved towards the edge of 46. Further depression of crosshead to effect sealing of the capsule therefore causes the heel 42 to trip the bell crank lever and permit the spring 49 to close the filling valve.

The opening and closing of the filling valve is thus effected automatically without the necessity of providing a filling cam.

Claims:

1. Apparatus for filling capsules or containers and for subsequently closing and fastening such vessels by means of a plastic metallic fastening element, which is caused to flow within the neck of the vessel to retain the sealing member, including in combination a hollow sealing plunger adapted to effect flowing of said plastic element within the neck of the vessel, a filling plunger resiliently slidable within said sealing plunger and adapter to rest upon without deforming said sealing member, and supporting means for the other end of said vessel.

2. Apparatus for filling capsules or containers and for subsequently closing and fastening such vessels by means of a plastic metallic fastening element, which is caused to flow within the neck of the vessel to retain the sealing member, including in combination a cross head, means for reciprocating said cross head, a ram secured to said cross head, a hollow sealing plunger rigid with said ram adapted to effect flowing of said plastic element within the neck of the vessel, a filling plunger resiliently slidable within said sealing plunger and adapted to rest upon without deforming said sealing member, and supporting means for the other end of said vessel.

3. Apparatus for filling capsules or containers and for subsequently closing and fastening such vessels by means of a plastic metallic fastening element, which is caused to flow within the neck of the vessel to retain the sealing member, including in combination a hollow sealing plunger adapted to effect flowing of said plastic element within the neck of the vessel, a filling plunger resiliently slidable within said sealing plunger and adapted to rest upon without deforming said sealing member, a feed table disposed beneath said cross head, a plurality of vessel supporting dies suitably supported near the periphery of said table, a platform pivotally carried upon the lever and an adjustable spring co-acting with said lever.

4. Apparatus for filling capsules or containers and for subsequently closing and fastening such vessels by means of a plastic metallic fastening element, which is caused to flow within the neck of the vessel to retain the sealing member, including in combination a hollow sealing plunger adapted to effect flowing of said plastic element within the neck of the vessel, a filling plunger resiliently slidable within said sealing plunger and adapted to rest upon without deforming said sealing member, a feed table disposed beneath said cross head, a plurality of supporting dies suitably supported near the periphery of said table, a platform pivotally carried upon the lever and an adjustable spring co-acting with said lever, a filling valve box chamber slidably supported on said cross head, a gas valve in said chamber and mechanism for ejecting said vessels when sealed from said supporting dies.

5. Apparatus for use in connection with the filling and closing of capsules or containers, including a cross head, a filling head resiliently slidable relatively to said cross head, actuating mechanism effecting reciprocation of said cross head, a ram secured to said cross head, a sealing plunger on said ram, a further plunger resiliently slidable within said sealing plunger, resilient supporting means for the capsules, a gas valve upon said filling head and means on said filling head co-acting with further means on said cross head to effect appropriate operation of said gas valve.

In testimony whereof we have signed our names to this specification.

HARRY VAUGHAN RUDSTON READ.
ROBERT HUNTER CAMPBELL.